(12) United States Patent
Maeda et al.

(10) Patent No.: US 8,313,104 B2
(45) Date of Patent: Nov. 20, 2012

(54) SEALING DEVICE

(75) Inventors: Toshiyuki Maeda, Nihonmatsu (JP);
Yoshiyuki Abe, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 525 days.

(21) Appl. No.: 12/595,030

(22) PCT Filed: Apr. 9, 2008

(86) PCT No.: PCT/JP2008/057019
§ 371 (c)(1),
(2), (4) Date: Oct. 7, 2009

(87) PCT Pub. No.: WO2008/126866
PCT Pub. Date: Oct. 23, 2008

(65) Prior Publication Data
US 2010/0133757 A1    Jun. 3, 2010

(30) Foreign Application Priority Data

Apr. 9, 2007    (JP) ................................. 2007-102008

(51) Int. Cl.
*F16J 9/12* (2006.01)
(52) U.S. Cl. ......... 277/459; 277/461; 277/465; 277/559
(58) Field of Classification Search .................. 277/459, 277/461, 465, 400, 559
See application file for complete search history.

(56) References Cited

U.S. PATENT DOCUMENTS

| | | | | |
|---|---|---|---|---|
| 1,636,027 A | * | 7/1927 | Walter | 277/464 |
| 3,501,155 A | * | 3/1970 | Dega et al. | 277/309 |
| 3,735,992 A | * | 5/1973 | Prostorov et al. | 277/464 |
| 3,744,805 A | * | 7/1973 | Heinrich | 277/400 |
| 3,785,660 A | * | 1/1974 | Bush | 277/559 |
| 4,557,488 A | * | 12/1985 | Litherland | 277/461 |
| 4,610,319 A | * | 9/1986 | Kalsi | 175/371 |
| 6,685,193 B2 | * | 2/2004 | Roberts et al. | 277/459 |
| 6,938,879 B2 | * | 9/2005 | Bancroft et al. | 251/306 |
| 7,959,159 B2 | * | 6/2011 | Hocker et al. | 277/559 |
| 2008/0073856 A1 | * | 3/2008 | Munekata | 277/559 |

FOREIGN PATENT DOCUMENTS

JP    S62-000856    1/1987

(Continued)

*Primary Examiner* — Vishal Patel
(74) *Attorney, Agent, or Firm* — Harness, Dickey & Pierce, P.L.C.

(57) ABSTRACT

A sealing device in which a good lubricating oil film is formed along the entire circumference of a sliding surface. The sealing device (1) is fitted in an annular groove formed in either of two elements that are a housing having a shaft hole and a shaft inserted through the shaft hole, and the sealing device (1) seals an annular gap between the two elements. The sealing device (1) has a seal ring (2) sliding against the other element by relative axial movements of the two elements. In the seal ring (2), on each of axially opposite ends of a sliding surface (20) sliding against the other element, there are formed grooves (22) extending from an end surface (21) of the seal ring (2) toward the axial center of a sliding surface (20). Further, in the seal ring (2), the boundary between each groove (22) and the sliding surface (20) is formed only by lines inclined relative to the direction of sliding of the sliding surface (20), and grooves (23) are circumferentially adjacently arranged in the seal ring (2) so that regions each having the boundary formed by the inclined lines are continuous along the entire circumference of the sliding surface (20).

4 Claims, 14 Drawing Sheets

FOREIGN PATENT DOCUMENTS

| | | |
|---|---|---|
| JP | S62-200044 | 9/1987 |
| JP | S64-055364 | 4/1989 |
| JP | H02-084061 | 6/1990 |
| JP | H07-043672 | 9/1995 |
| JP | 2001-304413 | 10/2001 |

* cited by examiner

FIG.11

| CONTACT SURFACE SHAPE | PRIOR-ART PRODUCT 1 | PRIOR-ART PRODUCT 2 | EMBODIMENT PRODUCT |
|---|---|---|---|
| CONTACT AREA | 2187mm² | 1370mm² | 1621mm² |
| EFFECTIVE PRESSURE RECEIVING AREA | 2187mm² | 1778mm² | 1913mm² |
| PRESSURE RECEIVING AREA REDUCTION RATE | — | −19% | −13% |
| ACHIEVING TEMPERATURE | 87°C | 76°C | 75°C |

SEALING DEVICE

CROSS-REFERENCE TO RELATED APPLICATIONS

This application is a 371 U.S. National Stage of International Application No. PCT/JP2008/057019, filed Apr. 9, 2008. This application claims the benefit of Japanese Patent Application No. JP 2007-102008, filed Apr. 9, 2007. The disclosures of the above applications are incorporated herein by reference.

TECHNICAL FIELD

The present invention relates to a sealing device used for a hydraulic cylinder or the like.

BACKGROUND ART

Conventionally, a sealing device shown in FIG. 15 is used between a hydraulic cylinder and a piston. FIG. 15 is a schematic half sectional view of the prior-art sealing device.

The sealing device 100 is for sealing an annular gap 400 between an inner peripheral face 201 of the cylinder 200 and an outer peripheral face 301 of the piston 300 and is fitted in an annular groove 302 formed in the outer peripheral face 301 of the piston 300. The sealing device 100 is formed of a resin seal ring 101 for sliding against the inner peripheral face 201 of the cylinder 200 and an elastic ring 102 fitted between the seal ring 101 and a groove bottom 303 of the annular groove 302 to give enlarging force to the seal ring 101.

In such a sealing device, an oil film made of lubricating oil is formed on a sliding surface between the seal ring 101 and the inner peripheral face 201 of the cylinder 200, which suppresses wearing and sliding resistance of the sliding surface and prevents occurrence of an unusual noise, stick slip, production of heat, and the like.

Provision of grooves in order to introduce the lubricating oil into the sliding surface of the seal ring to more reliably form the lubricating film or to maintain the lubricating film for a longer period of time is described in Patent Documents 1 and 2, for example.

Patent Document 1: Japanese Patent Application Laid-Open No. 2001-304413

Patent Document 2: Japanese Utility Model Application Laid-Open No. 07-043672

DISCLOSURE OF THE INVENTION

Problems to be Solved by the Invention

In the technique described in the Patent Document 1, however, grooves connecting a side to be sealed and an opposite side to the side to be sealed are formed in a sliding surface between a cylinder inner peripheral face and a bearing member surface and therefore the technique cannot be applied to a position that requires sealing.

Although grooves in a sliding surface are formed so as not to connect a side to be sealed and an opposite side to the side to be sealed in the technique described in the Patent Document 2, a lubricating film formed by the grooves does not cover the entire circumference of the sliding surface and sufficient effect cannot be obtained in some cases.

The present invention has been made to solve the above problems in the prior art and it is an object of the invention to provide a sealing device for forming a preferable lubricating film along the entire circumference of a sliding surface.

Means for Solving the Problems

To achieve the above object, there is provided a sealing device mounted in an annular groove formed in one of two members that are a housing having a shaft hole and a shaft inserted into the shaft hole to seal an annular gap between the two members, the device including a seal ring for sliding against the other member due to relative axial movements of the two members, wherein the seal ring includes, on each of axial opposite end portions of a sliding surface sliding against the other member, a plurality of grooves extending from an end face of the seal ring toward an axial center of the sliding surface, a boundary between the grooves and the sliding surface is formed only of lines inclined with respect to a sliding direction of the sliding surface, and the plurality of grooves are arranged to be adjacent to each other in a circumferential direction so that an area in which the boundary is formed of the inclined lines continues along an entire circumference of the sliding surface.

By forming the boundary between the grooves and the sliding surface only of the lines inclined with respect to the sliding direction, lubricating oil introduced into the grooves diagonally enter edge portions of the sliding surface due to the relative movements of the two members. As a result, resistance to entry of the lubricating oil into the sliding surface is reduced and a preferable lubricating film can be formed.

Here, surface pressure generated on the sliding surface is the highest at the end portions of the sliding surface and a surface pressure distribution shape has steep slopes at the end portions of the sliding surface where the surface pressure abruptly increases inward from the edge portions. Therefore, the lubricating oil that enters in a direction orthogonal to the edge portion of the sliding surface receives such a resistance that it has to climb the steep slope straight. On the other hand, if the lubricating oil diagonally enters the edge portion of the sliding surface, the lubricating oil receives such a resistance that it diagonally climbs the steep slope, i.e., gently climbs the slope, which reduces the resistance to entry of the lubricating oil into the sliding surface.

Therefore, it is easy to send more lubricating oil to the sliding surface and it is possible to form a thicker lubricating film.

Moreover, because the area in which the lubricating oil introduced into the grooves diagonally enters the edge portions of the sliding surface continues along the circumferential direction, the resistance to entry of the lubricating oil is reduced along the entire circumference of the sliding surface. Therefore, it is possible to form the preferable lubricating film along the entire sliding surface.

The sliding surface may include a recessed portion between the grooves formed at one end portion and the grooves formed at the other end portion.

By providing the recessed portion, it is possible to efficiently form an oil film, even if a stroke of relative movements of the two members is short. In other words, the lubricating oil that has reached the recessed portion from the grooves at the one end portion with the first stroke is temporarily retained in the recessed portion and moves farther toward the other end portion with the second stroke. In this way, it is possible to cover the sliding surface from one side to the other side with the oil film, even if the stroke is short.

The grooves may be inclined grooves extending to be inclined with respect to the axial direction and one and the other of the inclined grooves adjacent to each other in the circumferential direction may be adjacent to each other in such a manner that an overlap is formed between them when viewed in the axial direction.

If the grooves are the inclined grooves, the lubricating oil can diagonally enter the edge portions of the sliding surface.

If the grooves adjacent to each other in the circumferential direction partially overlap each other in the circumferential direction, the area in which the lubricating oil introduced into the grooves diagonally enters the edge portions of the sliding surface continues in the circumferential direction. As a result, the resistance to entry of the lubricating oil is reduced along the entire circumference of the sliding surface and it is possible to form the preferable lubricating film along the entire sliding surface.

The grooves may be wedge-shaped grooves and provided continuously along the entire circumference of the sliding surface.

If the grooves are the wedge-shaped grooves, the lubricating oil can diagonally enter the edge portions of the sliding surface. Because the lubricating oil introduced into the groove is gradually pushed into the narrower space, surface pressure on the sliding surface can be reduced by a wedge effect.

By continuously providing the wedge-shaped grooves, the edge portions of the sliding surface are in a serrated shape. Therefore, the lubricating oil diagonally enters the edge portions of the sliding surface along the entire circumference of the sliding surface. As a result, the resistance to entry of the lubricating oil is reduced along the entire sliding surface and it is possible to form a preferable lubricating film.

It is preferable that an axial width of the sliding surface does not change along the entire circumference.

As a result, a sliding width of the seal ring is constant in the circumferential direction and volume of a section is uniform in the circumferential direction and therefore strength of the seal ring is uniformized and stabilized to thereby suppress occurrence of damage due to nonuniform strength. Moreover, because the sliding width in the axial direction is constant in any sections, occurrence of perforating injury on the sliding surface due to a foreign matter is suppressed and sealing performance is stabilized.

Effect of the Invention

As described above, with the invention, it is possible to form the preferable lubricating film along the entire circumference of the sliding surface.

BRIEF DESCRIPTION OF DRAWINGS

FIG. 11 is a chart for explaining a relationship between a pressure receiving area and the achieving temperature.

Figure 1A:
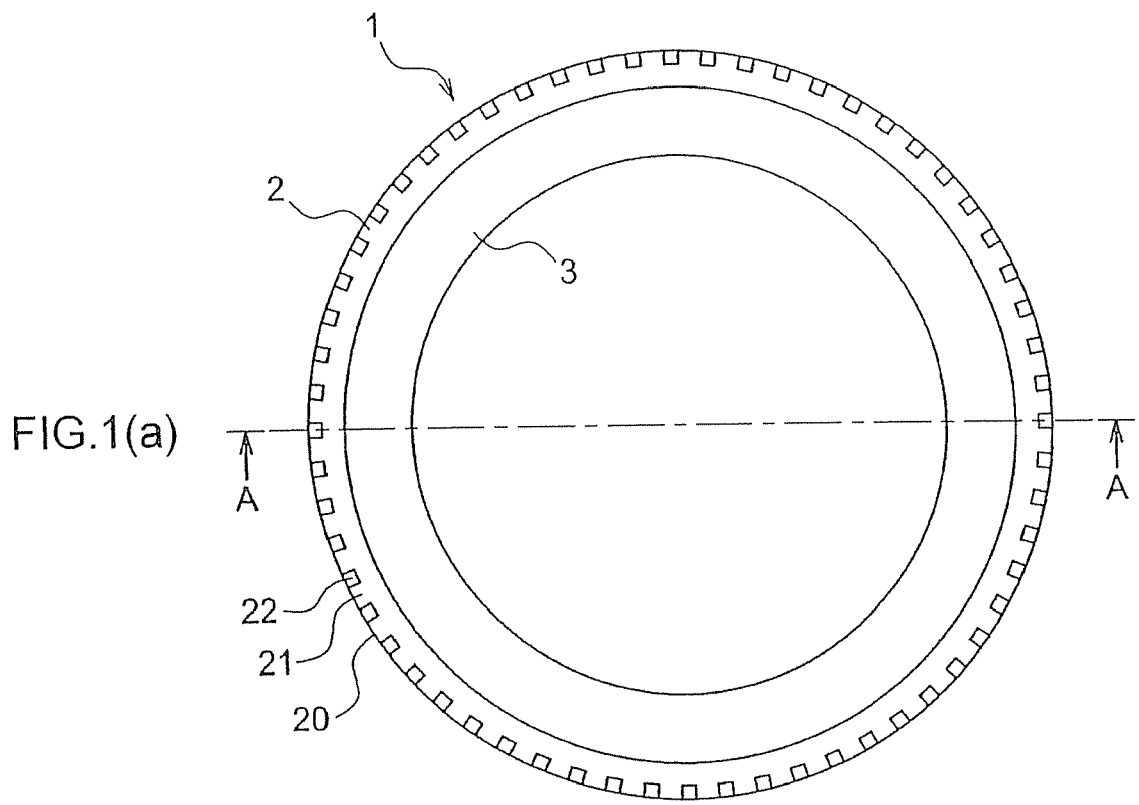
FIGS. 1(a) to 1(c) are schematic diagrams showing a structure of a sealing device according to an first embodiment.

EXPLANATIONS OF REFERENCE NUMERALS 1 sealing device
2 seal ring
20 outer peripheral face
21 side face
22 groove
23 wedge-shaped groove
24 recessed portion
3 elastic ring
4 housing
40 inner peripheral face
5 shaft
50 annular groove
51 side face
52 groove bottom
6 annular gap

BEST MODES FOR CARRYING OUT THE INVENTION

Best modes for carrying out the present invention will be described below in detail by using examples based on embodiments with reference to the drawings. However, dimensions, material, shapes, and relative positions of component parts described in the embodiments are not intended to limit a scope of the invention unless otherwise specified.

(First Embodiment)

Figure 1B:
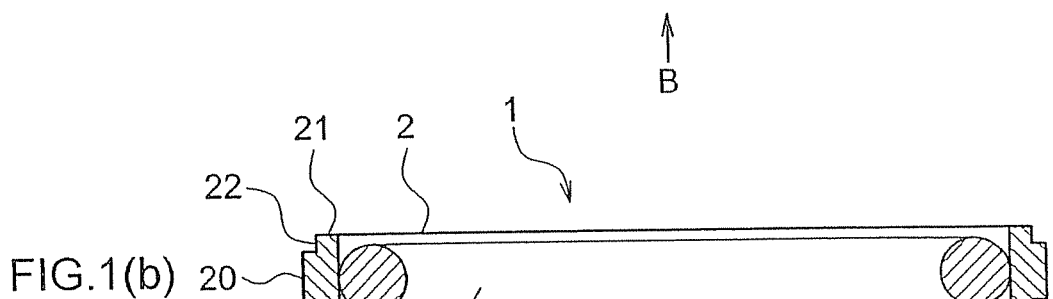
Figure 1C:
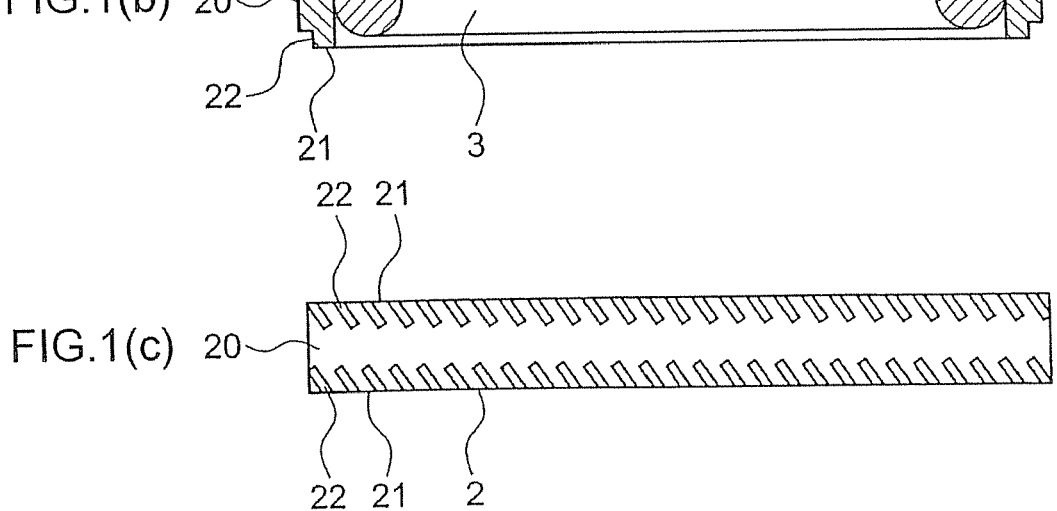
Figure 2:
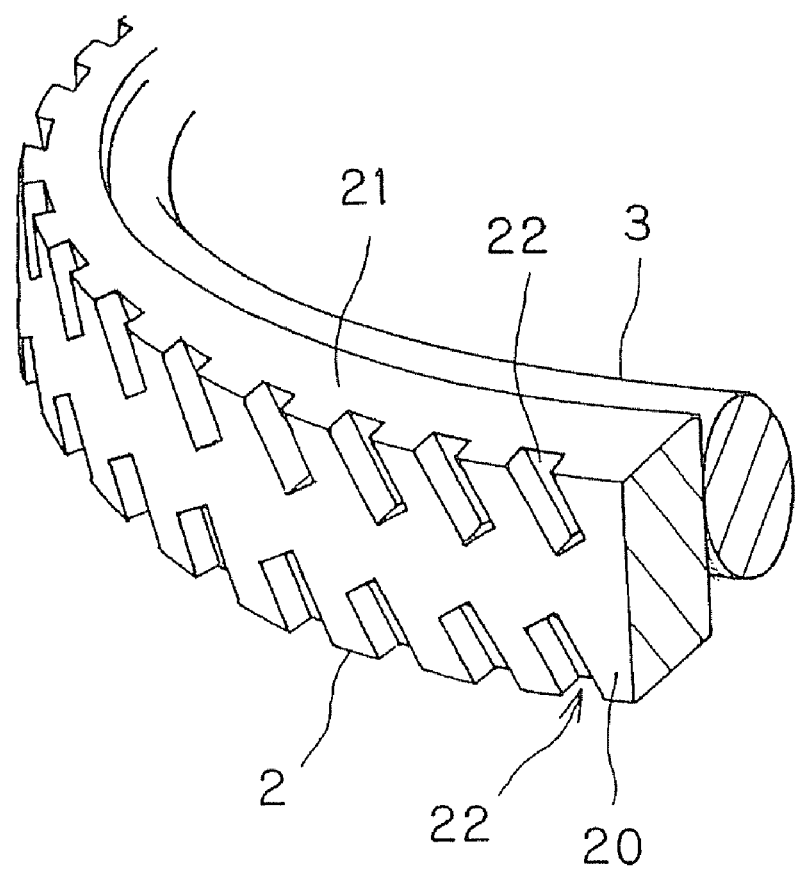
FIG. 2 is a schematic perspective view of the sealing device according to the first embodiment.
Figure 3A:
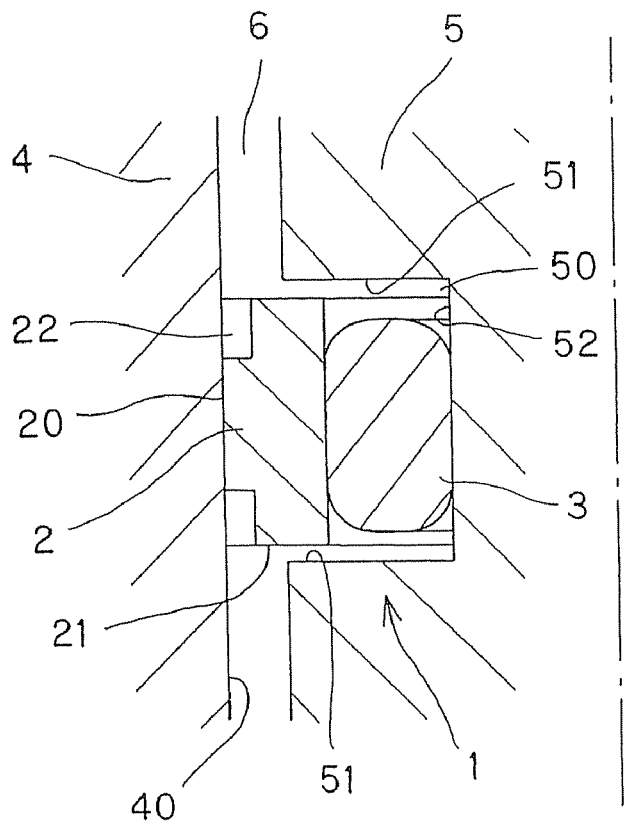
FIGS. 3(a) and (b) are schematic half sectional views of a mounted state of the sealing device according to the first embodiment.
Figure 3B:
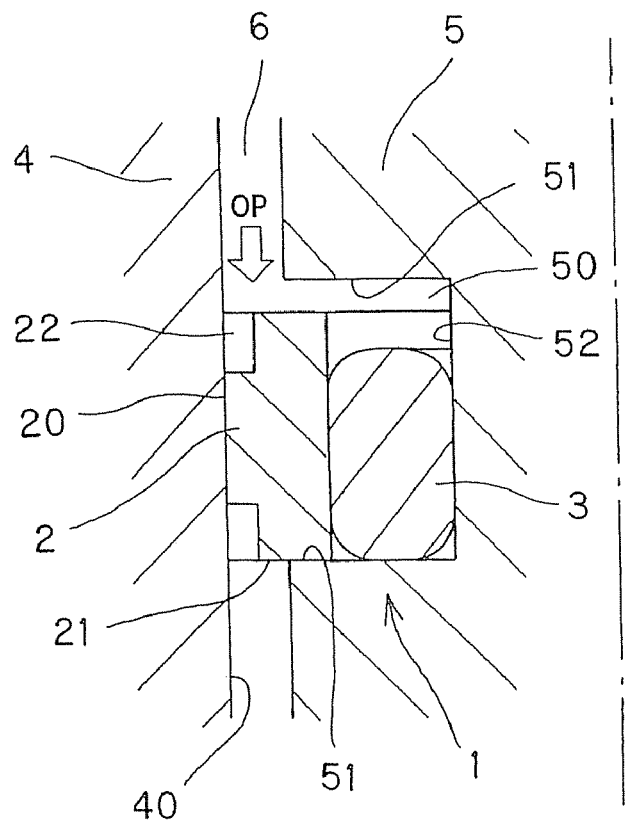

First, with reference to FIGS. 1 to 3, a general structure of a sealing device according to the embodiment of the invention will be described. FIGS. 1(a) to 1(c) are schematic diagrams showing a structure of the sealing device according to the embodiment. FIG. 1(a) is a view from an axial direction, FIG. 1(b) is a sectional view taken along a line A-A in FIG. 1(a), and FIG. 1(c) is a view from a direction of an arrow B in FIG. 1(a). FIG. 2 is a schematic perspective view of the sealing device according to the embodiment. FIGS. 3(a) and 3(b) are schematic half sectional views of a mounted state of the sealing device according to the embodiment. FIG. 3(a) shows a state without pressure and FIG. 3(b) shows a state under pressure.

The sealing device 1 according to the embodiment is used as a sealing device for a piston in a hydraulic cylinder, for example, and is formed of a seal ring 2 and an elastic ring 3. The sealing device 1 is fitted in an annular groove 50 formed in an outer peripheral face of a shaft 5 so as to seal an annular gap 6 between a housing (cylinder) 4 having a shaft hole and the shaft (a piston, a rod, or the like) 5 inserted into the shaft hole.

The seal ring 2 is an annular member having a substantially rectangular section and disposed on a side of an opening portion of the annular groove 50. An outer peripheral face 20 of the seal ring 2 slides against an inner peripheral face 40 of the housing 4 to thereby form a seal face for the housing 4. When oil pressure OP is applied, the seal ring 2 is pushed against an opposite side of the annular groove 50 to the oil pressure. As a result, a side face (end face) 21 of the seal ring 2 on the opposite side to the oil pressure comes in close contact with a side face 51 of the annular groove 50 to thereby form a seal face for the shaft 5.

As material of the seal ring 2, it is possible to use polytetrafluoroethylene (PTFE) widely used for a sliding member in general and all the general-purpose thermoplastic engineering resins such as polyamide (PA), polyether ether ketone (PEEK), polyphenylene sulfide (PPS), and polyacetal (POM).

The elastic ring 3 is an annular member having a substantially circular section and made of rubber material such as nitrile rubber and is compressed and fitted between the seal ring 2 and a groove bottom 52 of the annular groove 50. The elastic ring 3 biases the seal ring 2 toward the housing 4 with its elastic resilience to increase adhesion between the seal ring 2 and the housing 4. The sectional shape of the elastic ring 3 is not limited to the circle and various shapes can be employed properly.

A plurality of grooves 22 are formed in the outer peripheral face 20 of the seal ring 2 that is a sliding surface against the inner peripheral face 40 of the housing 4. The grooves 22 are inclined grooves extending from the side faces 21 of the seal ring 2 toward an inside (a center in an axial direction) of the outer peripheral face 20. The grooves 22 are respectively formed on axial opposite sides (opposite end portions) of the outer peripheral face 20 and have depths extending radially from the end portions of the outer peripheral face 20 to stop before a central portion.

Figure 4:
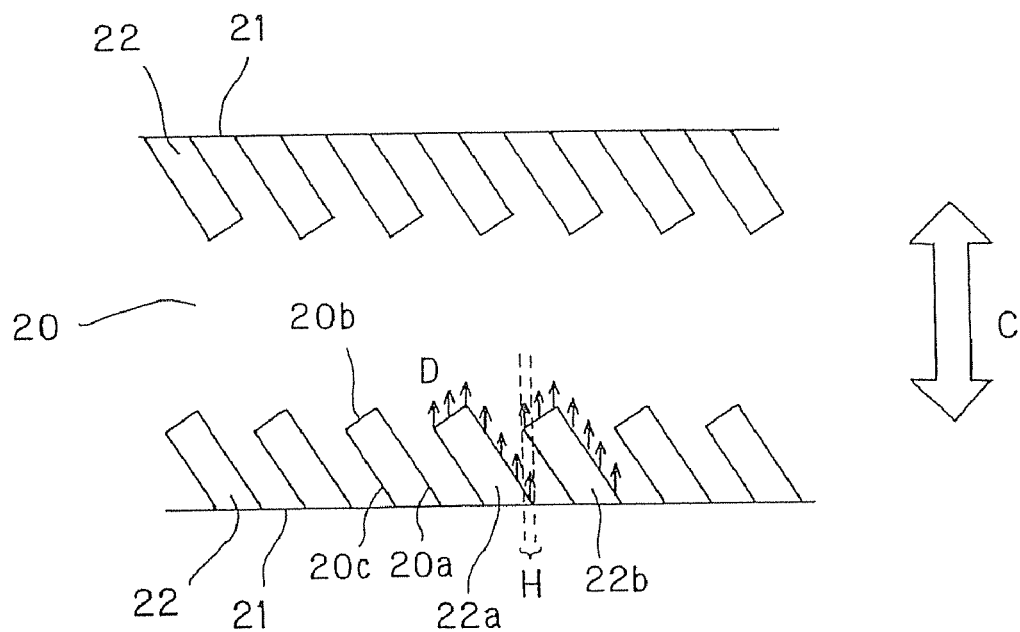
FIG. 4 is a schematic diagram showing a structure of an outer peripheral face of a seal ring of the sealing device according to the first embodiment.
Figure 5:
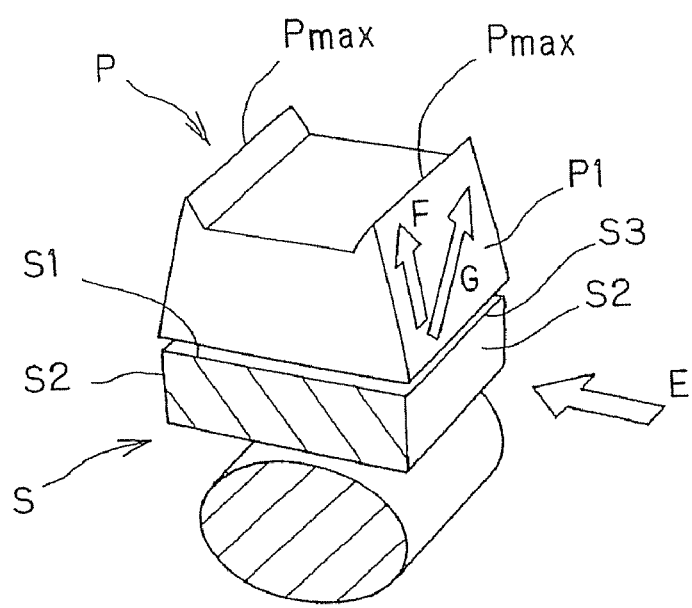
FIG. 5 is a drawing schematically showing surface pressure distribution formed on a sliding surface of the seal ring.

Next, with reference to FIGS. 4 and 5, the grooves 22 formed in the outer peripheral face 20 and characterizing the sealing device 1 according to the embodiment will be described in detail. FIG. 4 is a schematic diagram showing a structure of the outer peripheral face 20 of the seal ring 2 of the sealing device 1 according to the embodiment. FIG. 5 is a drawing schematically showing surface pressure distribution formed on the sliding surface of the seal ring. The grooves 22 have similar structures and are symmetrically formed in the axial direction on the opposite end portions of the outer peripheral face 20. Therefore, only the grooves on one of the end portions will be described in the following description and the grooves on the other end portion will not be described.

The grooves 22 are formed to facilitate interposition of lubricating oil in a sliding portion between the inner peripheral face 40 of the housing 4 and the outer peripheral face 20 of the seal ring 2 and extend from the side face 21 of the seal ring 2 toward the center side of the outer peripheral face 20 in directions inclined with respect to the axial direction.

All boundaries between the grooves 22 and the outer peripheral face 20, i.e., edge portions 20a, 20b, and 20c of the outer peripheral face 20 at portions provided with the grooves 22 are formed of lines inclined with respect to the axial direction (sliding direction C of the seal ring 2) and therefore the lubricating oil introduced into the grooves 22 diagonally enter the edge portions 20a, 20b, and 20c of the outer peripheral face 20 (arrows D) due to sliding of the seal ring 2. In this way, resistance to entry of the lubricating oil into the outer peripheral face 20 is reduced and it is possible to satisfactorily form a lubricating film.

In other words, the surface pressure generated on the sliding surface (outer peripheral face) of the seal ring S is the highest at the opposite end portions (end faces S2) of the sliding surface S1 and the surface pressure distribution shape P has steep slopes P1 at the end portions of the sliding surface S1 where the surface pressure abruptly increases from edges to maximum surface pressure Pmax.

Therefore, if the edge portion S3 of the sliding surface S1 is orthogonal to the sliding direction (an arrow E) of the seal ring S, the lubricating oil enters the edge portion 53 of the sliding surface S1 in an orthogonal direction to the edge portion S3 and receives such a resistance that it has to climb the steep slope P1 straight (an arrow F).

On the other hand, if the lubricating oil diagonally enters the edge portion S3 of the sliding surface S, the lubricating oil receives such a resistance that it diagonally climbs the steep slope P1 (an arrow G), i.e., gently climbs the slope P1, which reduces the resistance to entry of the lubricating oil into the sliding surface.

Therefore, as shown in FIG. 4, with such a structure that the lubricating oil introduced into the groove 22 enters the outer peripheral face (sliding surface) 20 not in orthogonal directions but in diagonal directions to the edge portions 20a, 20b, and 20c, the resistance to entry of the lubricating oil can be reduced and it is easy to send more lubricating oil to the outer peripheral face 20. As a result, it is possible to interpose a thick lubricating film between the inner peripheral face 40 of the housing 4 and the outer peripheral face 20 of the seal ring 2.

Moreover, an overlap H in a circumferential direction is formed between a groove 22a and a groove 22b adjacent to each other in the circumferential direction. In other words, the groove 22a and the groove 22b are adjacent to each other in such a manner that the closest portion of the groove 22a to the groove 22b (an entrance portion of the groove 22a) and the closest portion of the groove 22b to the groove 22a (an inner portion of the groove 22b) are arranged in a partially staggered configuration in the circumferential direction. In other words, on a phantom line extending in the axial direction (sliding direction) from any one point on the boundary between one 22a of the adjacent grooves 22a and 22b and the outer peripheral face 20, the boundary between the other groove 22b and the outer peripheral face 20 exists. When the grooves 22a and 22b are seen from the axial direction (projected), they overlap each other (the overlap H is formed).

By forming the overlap between the adjacent grooves, an area where the lubricating oil introduced into the grooves 22 diagonally enters the edge portions of the outer peripheral face 20 continues along the entire circumference of the outer peripheral face 20. Therefore, the resistance to entry of the lubricating oil is reduced along the entire circumference of the outer peripheral face 20 and it is possible to form the satisfactory lubricating film along the entire circumference of the outer peripheral face 20.

(Second Embodiment)

Figure 6:
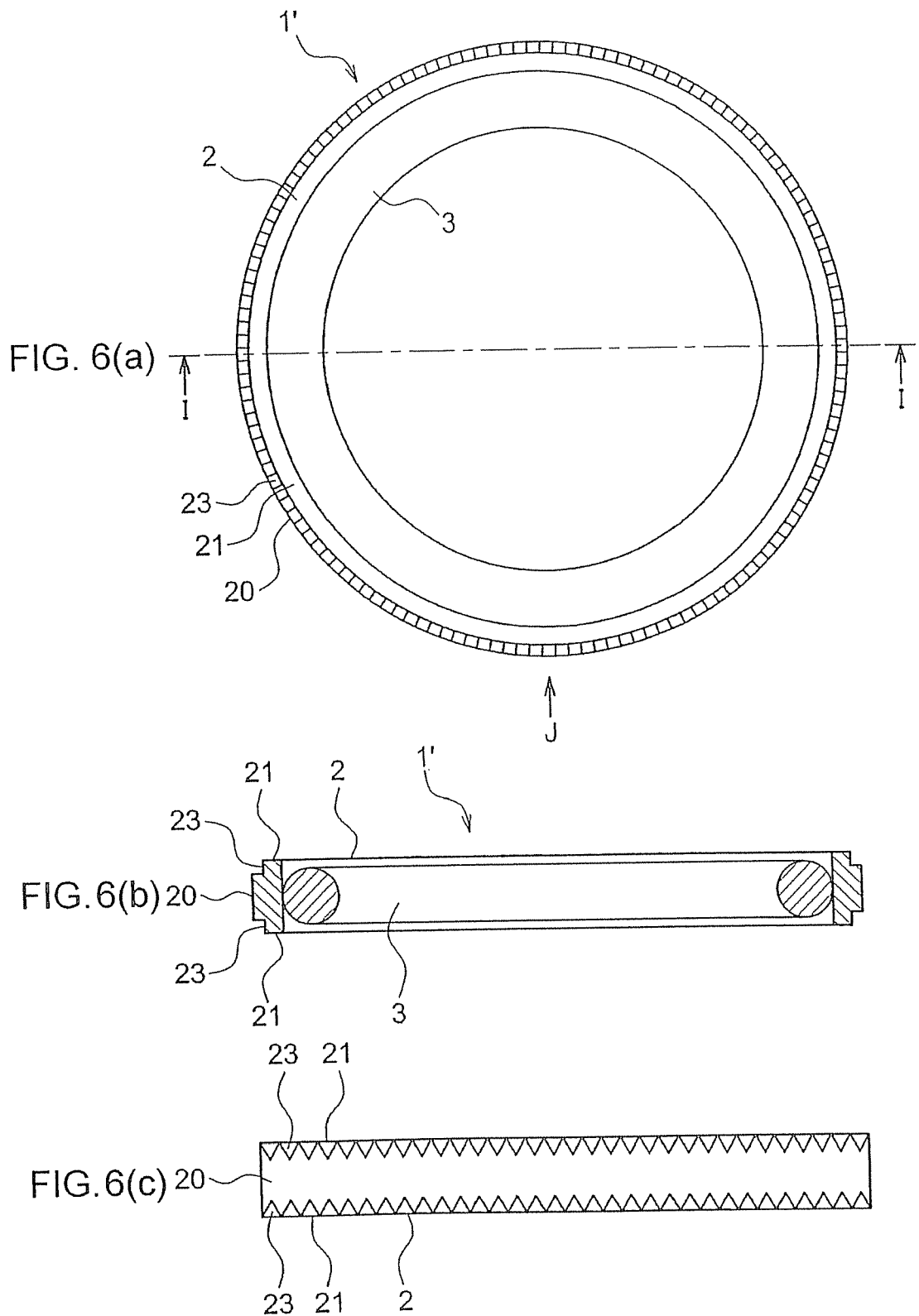
FIGS. 6(a) to 6(c) are schematic diagrams showing a structure of a sealing device according to an second embodiment.
Figure 7:
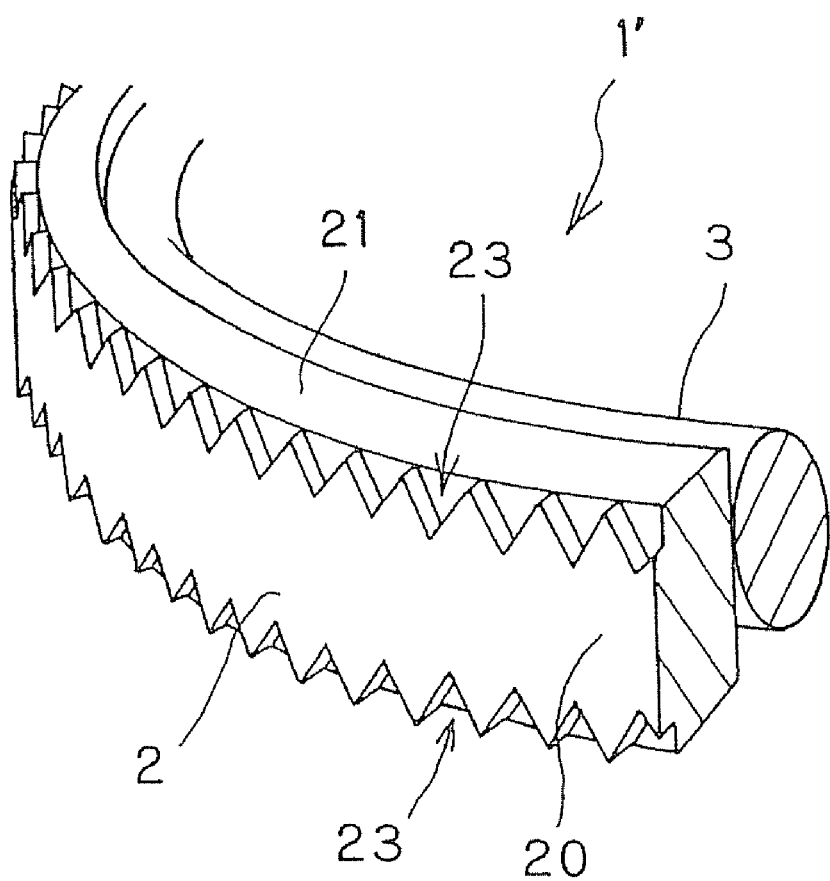
FIG. 7 is a schematic perspective view of the sealing device according to the second embodiment.

Next, a sealing device according to a second embodiment of the invention will be described with reference to FIGS. 6 and 7. FIGS. 6(a) to 6(c) are schematic diagrams showing a structure of the sealing device according to the embodiment. FIG. 6(a) is a view from the axial direction, FIG. 6(b) is a sectional view taken along a line I-I in FIG. 6(a), and FIG. 6(c) is a view from a direction of an arrow J in FIG. 6(a). FIG. 7 is a schematic perspective view of the sealing device according to the embodiment. Components similar to those in the first embodiment will be provided with same reference numerals and description of them will not be repeated while only different points will be described.

In the sealing device 1' according to the embodiment, grooves formed in the outer peripheral face 20 of the seal ring 2 are wedge-shaped grooves 23. In other words, a groove width of the wedge-shaped groove 23 gradually reduces from the side face 21 of the seal ring 2 toward the inside (the axial center) of the outer peripheral face 20 and a depth of the groove 23 extends radially from the end portion of the outer peripheral face 20 and stops before a central portion.

As shown in FIGS. 6(*a*) to 7, the adjacent wedge-shaped grooves 23 are provided continuously without intervals in the circumferential direction and a boundary between the wedge-shaped grooves 23 and the outer peripheral face 20, i.e., edge portions of the outer peripheral face 20 are in a serrated shape. Therefore, the edge portions of the outer peripheral face 20 are formed only of diagonal lines with respect to the axial direction (sliding direction of the seal ring 2) and the resistance to entry of the lubricating oil is reduced along the entire circumference of the outer peripheral face.

Because the lubricating oil is pushed into the space formed of the wedge-shaped groove 23 and gradually narrowing in the siding direction, forces for moving the housing 4 and the seal ring 2 away from each other are generated and the surface pressure between the inner peripheral face 40 of the housing 4 and the outer peripheral face 20 of the seal ring 2 is reduced (a wedge effect). As a result, a surface pressure gradient of the outer peripheral face 20 of the seal ring 2 is reduced and it is possible to interpose an appropriate lubricating film between the housing 4 and the seal ring 2.

Here, the wedge effect exerted by the wedge-shaped groove 23 increases as an angle formed by the two boundaries between the respective wedge-shaped grooves 23 and the outer peripheral face 20 form becomes smaller, i.e., as a tip end angle of the wedge shape of the wedge-shaped groove 23 becomes more acute, which increases the effect of reduction in the surface pressure gradient.

If an area of the outer peripheral face 20 is small, i.e., if a contact area with the inner peripheral face 40 of the housing 4 is small, the surface pressure becomes high. Therefore, an axial depth (length) of the wedge-shaped groove 23 is preferably shallow (short) so as not to reduce the area of the outer peripheral face 20 beyond necessity.

(Verification of Lubrication Improvement Effect)

Figure 8:
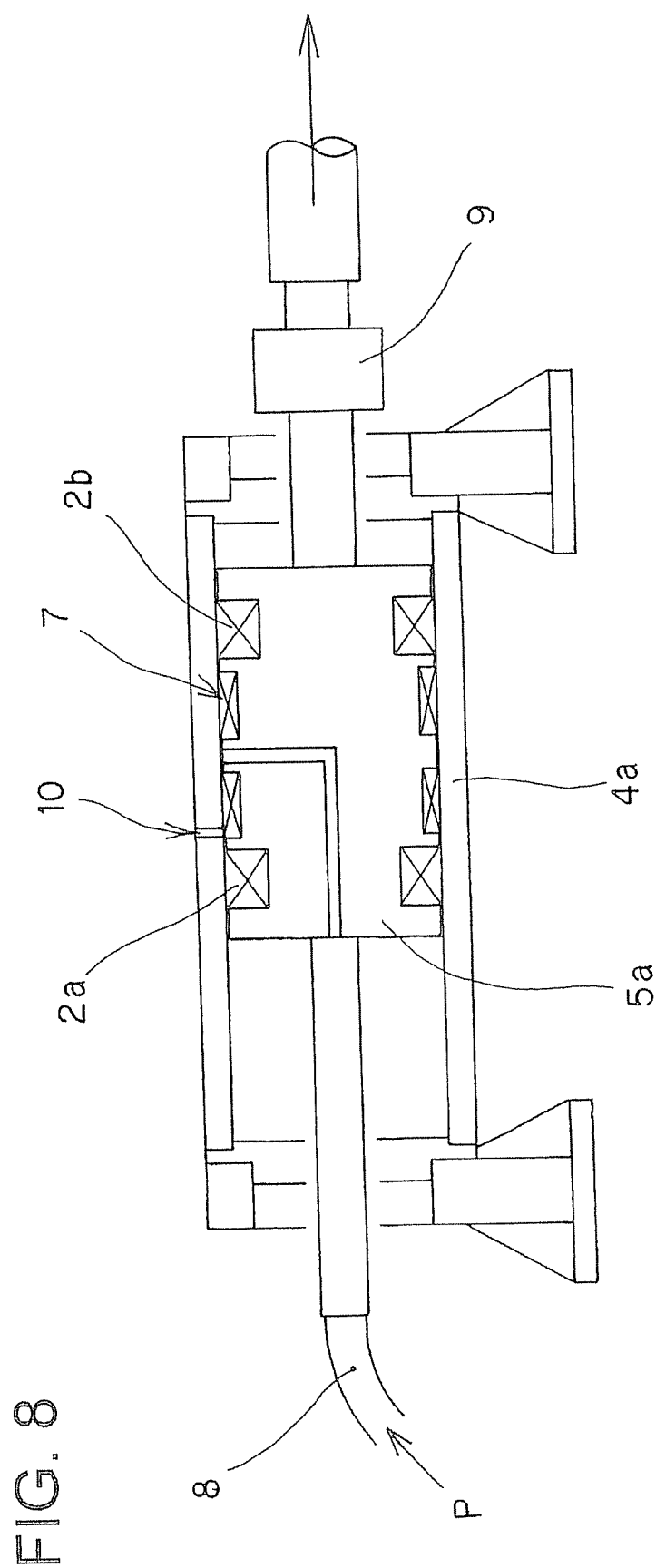
FIG. 8 is a schematic diagram showing a general structure of a testing machine.
Figure 9:
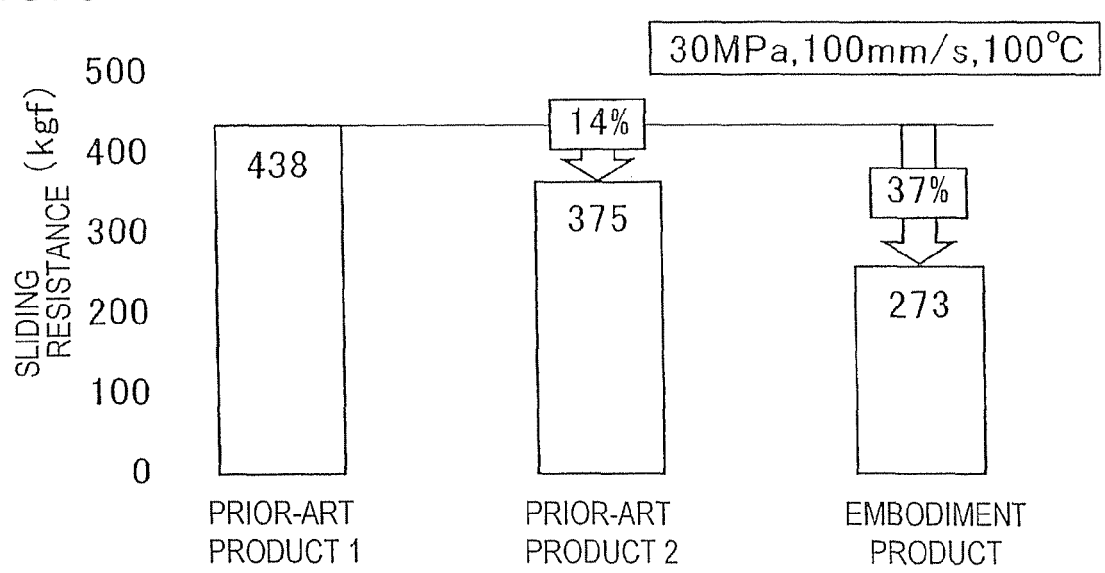
FIG. 9 is a chart for comparing sliding resistances of seal rings.
Figure 10:
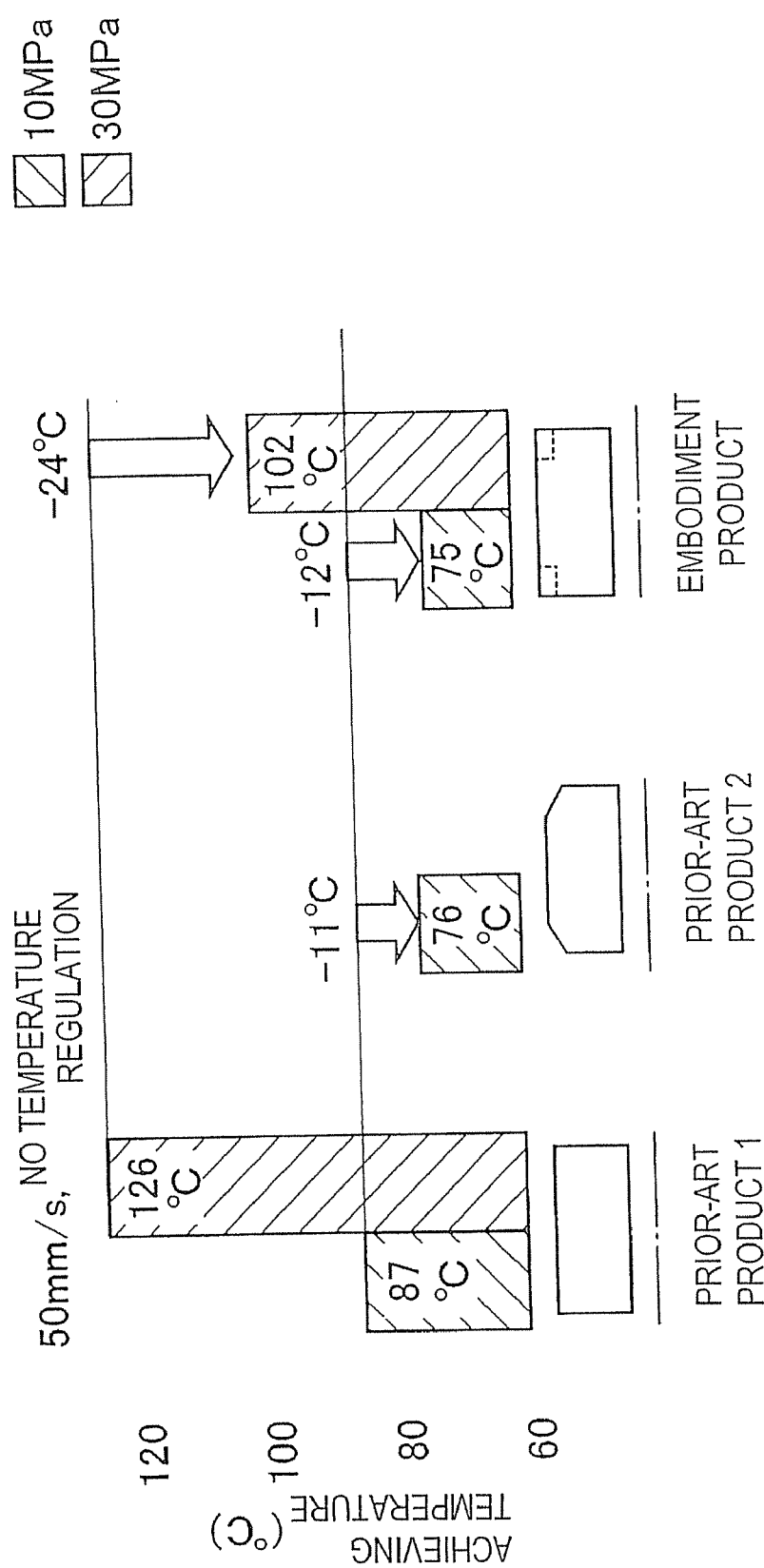
FIG. 10 is a chart for comparing achieving temperatures of the seal rings.

Here, the effect of improving the lubrication characteristic in the second embodiment was verified with reference to FIGS. 8 to 11 based on results of tests comparing with prior-art products. FIG. 8 is a schematic diagram showing a general structure of a testing machine. FIG. 9 is a chart for comparing sliding resistances of seal rings. FIG. 10 is a chart for comparing achieving temperatures of the seal rings. FIG. 11 is a chart for explaining a relationship between a pressure receiving area and the achieving temperature.

As shown in FIG. 8, the testing machine includes a cylinder 4a and a piston 5a coupled to a driving cylinder (not shown) to axially reciprocate in the cylinder 4a. In annular grooves formed in opposite ends of an outer peripheral face of the piston 5a, seal rings 2a and 2b as samples to be evaluated are fitted, respectively. A wear ring 7 is mounted between the two samples and pressure passing through a hose 8 and an inside of the piston 5a is applied between the two samples. A reference numeral 9 designates a load cell and 10 designates a wall temperature measuring portion for measuring wall temperature of the cylinder 4a.

While predetermined constant pressure (10 MPa, 30 MPa, or the like) was applied between the two samples and the pressure was acting on the sealing devices 2a and 2b, the piston 5a was reciprocated by the driving cylinder and the sealing devices 2a and 2b were slid against the inner peripheral face of the cylinder 4a.

When the wall temperature of the cylinder 4a increases due to production of heat caused by reciprocation of the piston 5a and the temperature increase becomes saturated, temperature at this time (temperature when heat production and heat radiation become balanced) is defined as the achieving temperature and the achieving temperature was measured.

The sliding resistance was measured by measuring a load necessary for reciprocation of the piston 5a with the load cell 9 and extracting the sliding resistance from the waveform.

A product corresponding to the seal ring 2 in the second embodiment, i.e., the product having the wedge-shaped grooves formed continuously on axial opposite ends of the outer peripheral face (sliding surface) of the seal ring was taken as an embodiment product, a prior-art seal ring without wedge-shaped grooves and having a rectangular section was taken as a prior-art product 1, a seal ring in which axial opposite ends of a seal ring outer peripheral face were tapered was taken as a prior-art product 2, and various values such as achieving temperatures and sliding resistances of them were compared.

As shown in FIG. 9, the sliding resistance of the embodiment product was 273 kgf while the sliding resistances of the prior-art product 1 and the prior-art product 2 were 438 kgf and 375 kgf, respectively. In other words, by forming the wedge-shaped grooves, the sliding resistance was reduced by 37% from that of the prior-art product 1 and by 14% from that of the prior-art product 2. Therefore, it is clear that the sliding resistance of the embodiment product provided with the wedge-shaped grooves is reduced by a greater amount from that of the prior-art product 1 without any grooves than that of the prior-art product 2 provided with the tapered faces. Here, the test was conducted under conditions of reciprocation speed of 100 mm/sec, the pressure between the two samples of 30 MPa, and a stroke length of 100 mm. In this test, the testing machine was actuated while constantly maintaining temperature of an outer peripheral face (outer wall) at a portion as close as possible to the sliding portion (inner peripheral face) of the cylinder at 100° C. To put it concretely, a hole was formed with a drill by stopping the drill immediately before it penetrated the cylinder from the outer periphery side to the inner periphery side (about 1 mm), a thermocouple that was a temperature sensor was embedded in the hole, heating was controlled with a heater so that a measured temperature by the thermocouple was constantly maintained at 100° C. In this way, the temperature near the sliding surface of the cylinder was constantly maintained at 100° C.

As shown in FIG. 10, the achieving temperature when the pressure between the two samples was 10 MPa in the embodiment product was 75° C. while the achieving temperatures in the prior-art product 1 and the prior-art product 2 were 87° C. and 76° C., respectively. The achieving temperature of the embodiment product was 12° C. lower than that of the prior-art product 1. The achieving temperature when the pressure between the two samples was 30 MPa in the embodiment product was 102° C. while the achieving temperature in the prior-art product 1 was 126° C. The achieving temperature of the embodiment product was 24° C. lower than that of the prior-art product 1. In other words, it is clear that the embodiment product is less susceptible to heat produced by sliding than the prior-art product 1. Because the reduction rate of the achieving temperature from that of the prior-art 1 was greater when the pressure was 30 MPa than when it was 10 MPa, it is clear that the embodiment product is suitable especially for use under high pressure. Here, the test was conducted under conditions of reciprocation speed of 50 mm/sec and the stroke length of 100 mm.

As shown in FIG. 11, although the embodiment product has a larger contact area and a larger effective pressure receiving area than the prior-art product 2 and has the smaller reduction rate in the pressure receiving area from the prior-art product 1 than the prior-art product 2, it has the same level of achieving temperature as the prior-art product 2. In other words, because the embodiment product has the same level of reduction rate in the achieving temperature in spite of the smaller reduction rate in the pressure receiving area, it is estimated that provision of the wedge-shaped grooves as in the embodiment product has greater lubrication improvement effect than provision of the tapered faces as in the prior-art product 2.

(Third Embodiment)

Figure 12A:
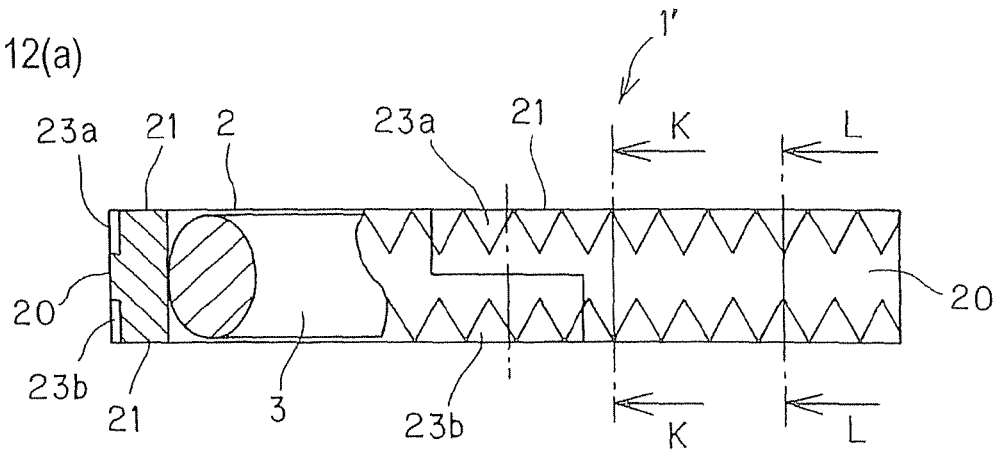
FIGS. 12(a) to 12(g) are schematic diagrams showing a structure of a sealing device according to a third embodiment.
Figure 12B:
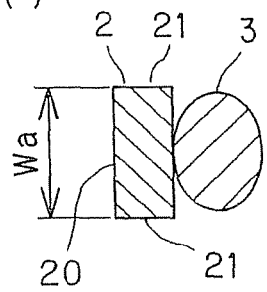
Figure 12C:
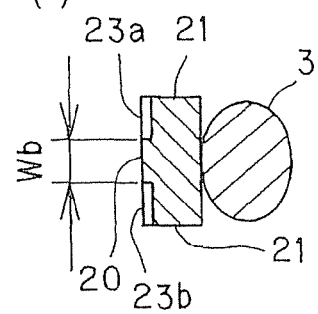
Figure 12D:
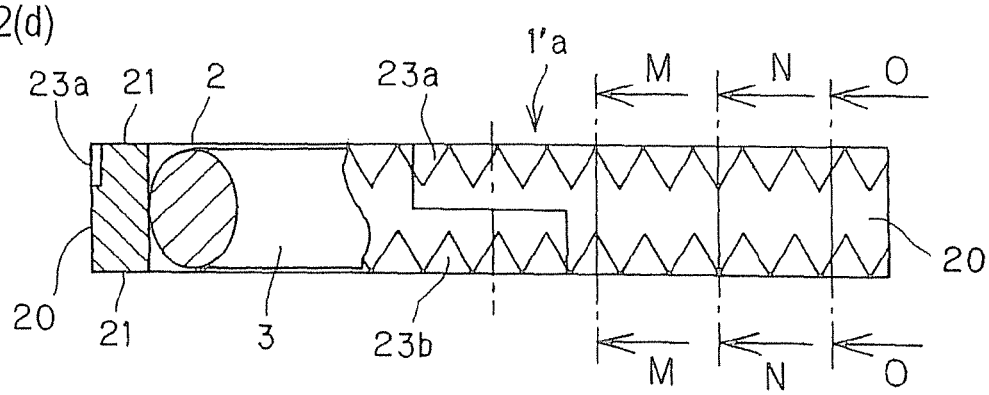
Figure 12E:
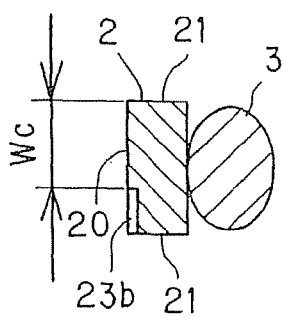
Figure 12F:
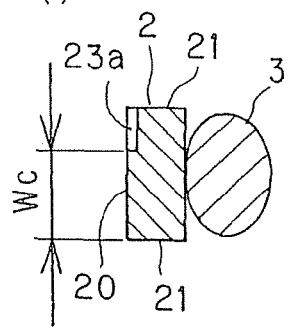
Figure 12G:
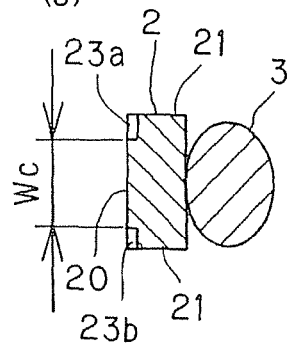

Next, with reference to FIG. 12, a sealing device according to a three embodiment of the invention will be described. FIGS. 12(a) to 12(g) are drawings for explaining differences between structures of the sealing device according to the present embodiment and the sealing device according to the second embodiment. FIG. 12(a) is a schematic diagram showing the sectional structure of the sealing device according to the second embodiment and the structure of the outer peripheral face of the seal ring, FIG. 12(b) is a sectional view taken along a line K-K in FIG. 12(a), FIG. 12(c) is a sectional view taken along a line L-L in FIG. 12(a), FIG. 12(d) is a schematic diagram showing a sectional structure of the sealing device according to the three embodiment and a structure of an outer peripheral face of a seal ring, FIG. 12(e) is a sectional view taken along a line M-M in FIG. 12(d), FIG. 12(f) is a sectional view taken along a line N-N in FIG. 12(d), and FIG. 12(g) is a sectional view taken along a line O-O in FIG. 12(d). The sections described here are sections along planes including an axis of the sealing device and the same holds true for sections in the following description.

As shown in FIG. 12(a), in the wedge-shaped grooves 23 formed on the outer peripheral face of the seal ring 2 of the sealing device according to the second embodiment, wedge-shaped grooves 23a formed on one side in the axial direction of the outer peripheral face 20 and wedge-shaped grooves 23b formed on the other side are disposed symmetrically in the axial direction, i.e., boundaries between the wedge-shaped grooves adjacent to each other in the circumferential direction and apexes of the wedge shapes are aligned in the circumferential direction. Therefore, axial width of the sliding surface (outer peripheral face 20) changes in the circumferential direction and volume of the section of the seal ring 2 changes in the circumferential direction.

In other words, as shown in FIG. 12(b), in the section along the boundary between the wedge-shaped grooves adjacent in the circumferential direction, the sliding surface (outer peripheral face 20) is formed to cover width of the seal ring 2 (axial length of the outer peripheral face) and sliding width Wa is the largest. The volume of the section of the seal ring 2 is also the largest at this time. As shown in FIG. 12(c), in the section at the apex of the wedge shape of the wedge-shaped groove, the sliding surface is formed between the apexes of the one wedge-shaped groove 23a and the other wedge-shaped groove 23b and the sliding width Wb is the smallest. The volume of the section of the seal ring 2 is the smallest at this time.

On the other hand, in the sealing device according to the embodiment, in the wedge-shaped grooves 23 formed in the outer peripheral face of the seal ring 2, the wedge-shaped grooves 23a provided on one side in the axial direction of the outer peripheral face 20 and the wedge-shaped grooves 23b provided on the other side are staggered, i.e., apexes of the one wedge-shaped grooves are aligned in the circumferential direction with boundaries between the other wedge-shaped grooves adjacent to each other. Therefore, as shown in FIG. 12(d), the sliding surface is meandering in the circumferential direction in the embodiment. As shown in FIGS. 12(e) to 12(g), axial width Wc of the sliding surface is always constant. Moreover, volume of the section of the seal ring 2 is also constant in the circumferential direction.

In the embodiment, because the sliding width Wc of the seal ring 2 is constant in the circumferential direction and the volume of the section is uniform without changing in the circumferential direction, strength of the seal ring 2 is uniformized and stabilized to thereby suppress occurrence of damage due to nonuniform strength. Moreover, because the sliding width Wc in the axial direction is constant in any sections, occurrence of perforating injury on the sliding surface due to a foreign matter is suppressed and sealing performance is stabilized.

(Fourth Embodiment)

Figure 13:
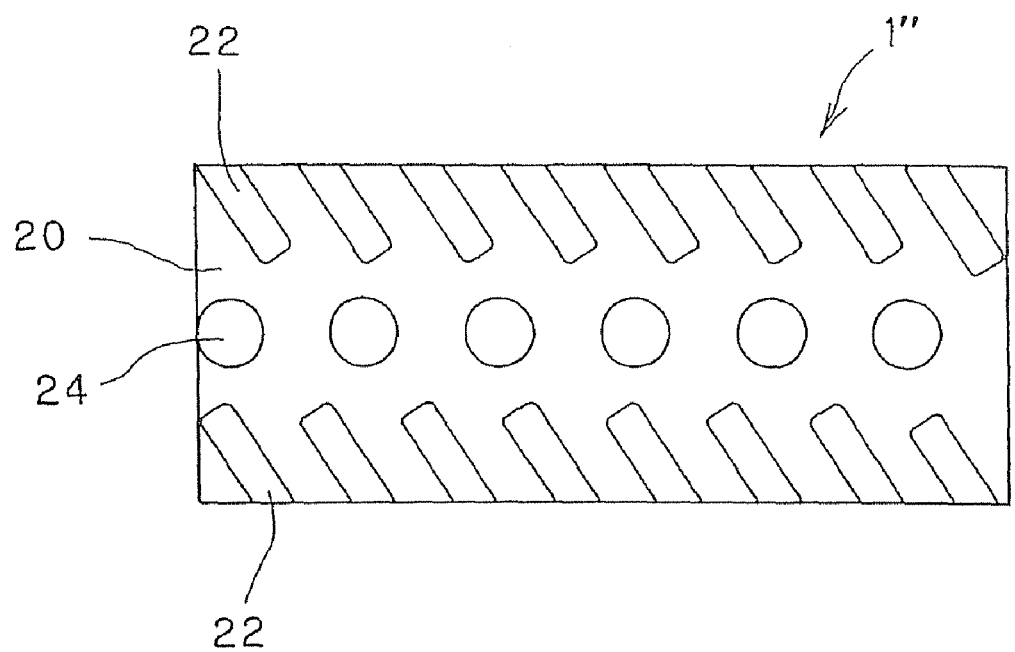
FIG. 13 is a schematic diagram showing a structure of an outer peripheral face of a seal ring of a sealing device according to a fourth embodiment.

Next, a sealing device according to a fourth embodiment of the invention will be described with reference to FIG. 13. FIG. 13 is a schematic diagram showing a structure of an outer peripheral face of a seal ring of the sealing device according to the embodiment. Components similar to those in the above embodiments will be provided with same reference numerals and description of them will not be repeated while only different points will be described.

The sealing device 1″ according to the embodiment is the sealing device 1 according to the embodiment, but with the seal ring 2 having recessed portions 24 formed in an area between the grooves 22 formed at the one end portion of the outer peripheral face 20 and the grooves 22 formed at the other end portions.

By forming the recessed portions 24 in this manner, it is possible to efficiently form an oil film, even if a stroke of relative movements of the housing 4 and the shaft 5 in the axial direction is short. In other words, the lubricating oil that has reached the recessed portions 24 from the grooves 22 at the one end portion with the first stroke is temporarily retained in the recessed portions 24 and moves farther (to the other end portion) with the second stroke. In this way, it is possible to cover the outer peripheral face 20 from one side to the other side with the oil film, even if the stroke is short.

If the recessed portions 24 are applied to the sealing devices of each of the above embodiments, the similar effect can be obtained.

Although the sealing device according to each of the embodiments is mounted in the mounting groove formed in the outer periphery of the shaft in the above description, the invention is not limited to it. It is also possible that the sealing device is mounted in a mounting groove formed in the shaft hole of the housing to slide against the outer peripheral face of the shaft.

With the sealing device according to each of the embodiments, the lubrication performance on the sliding surface is improved as described above, which expands a range of options of a material of the seal ring. In other words, it is possible to employ, as material of the seal ring 2, general-purpose engineering resins such as polyamide (hereafter referred to as PA) which has not been basically employed for the conventional sliding member.

As compared with polytetrafluoroethylene (hereafter referred to as PTFE) which is excellent in sliding characteristic and used most widely, PA and the like are inferior in the sliding characteristic but lower in a unit price of a raw material allows lower material cost of the seal ling.

If PTFE is employed for use under high pressure, it is necessary to use a backup ring made of PA or the like as well to prevent the seal ring 2 from protruding into the annular gap 6. On the other hand, PA or the like with higher elasticity than PTEF has functions of both the seal ring and backup ring and therefore can be used alone without the backup ring even for the use under high pressure, which reduces the number of members.

From the view point of production, PTFE needs to be formed into material by compression molding and the material needs to be formed into a final shape by cutting or the like. PA or the like, on the other hand, can be mass produced in the small number of steps by injection molding. Therefore, the number of production steps can be reduced and production cost can be reduced substantially due to the above-mentioned lower material cost.

(Modifications)

Figure 14A:
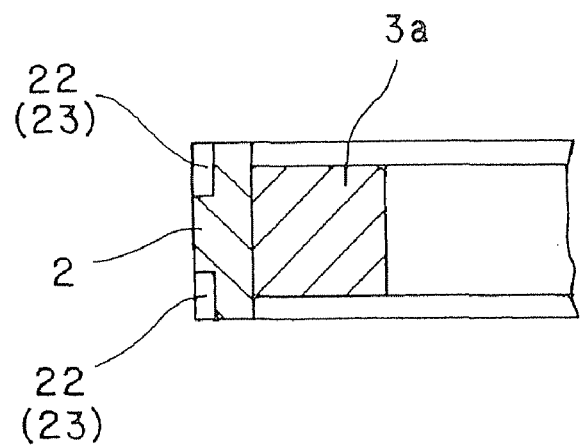
FIGS. 14(a) to 14(c) are schematic half sectional views of sealing devices according to modifications.
Figure 14B:
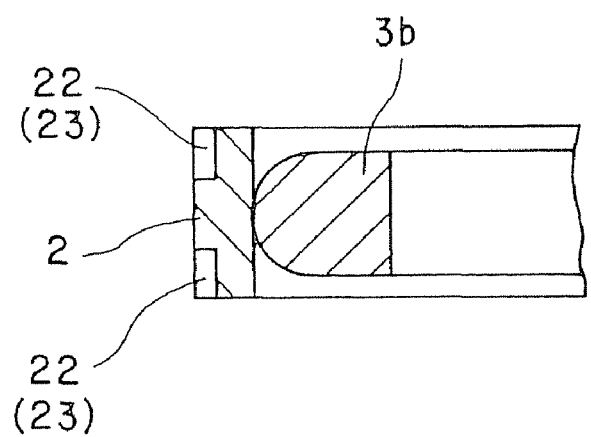
Figure 14C:
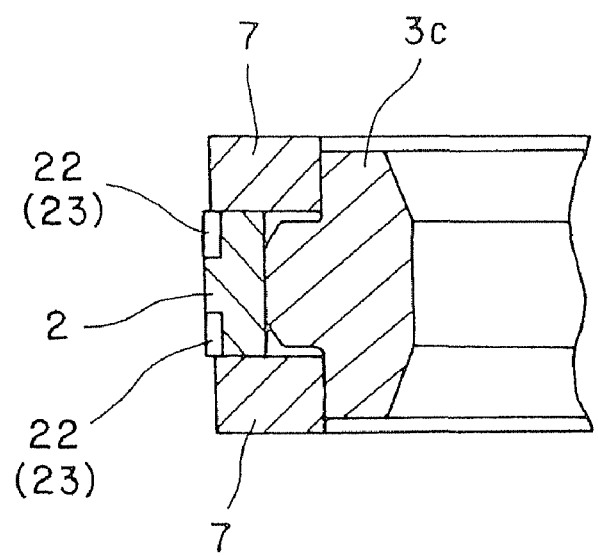
Figure 15:
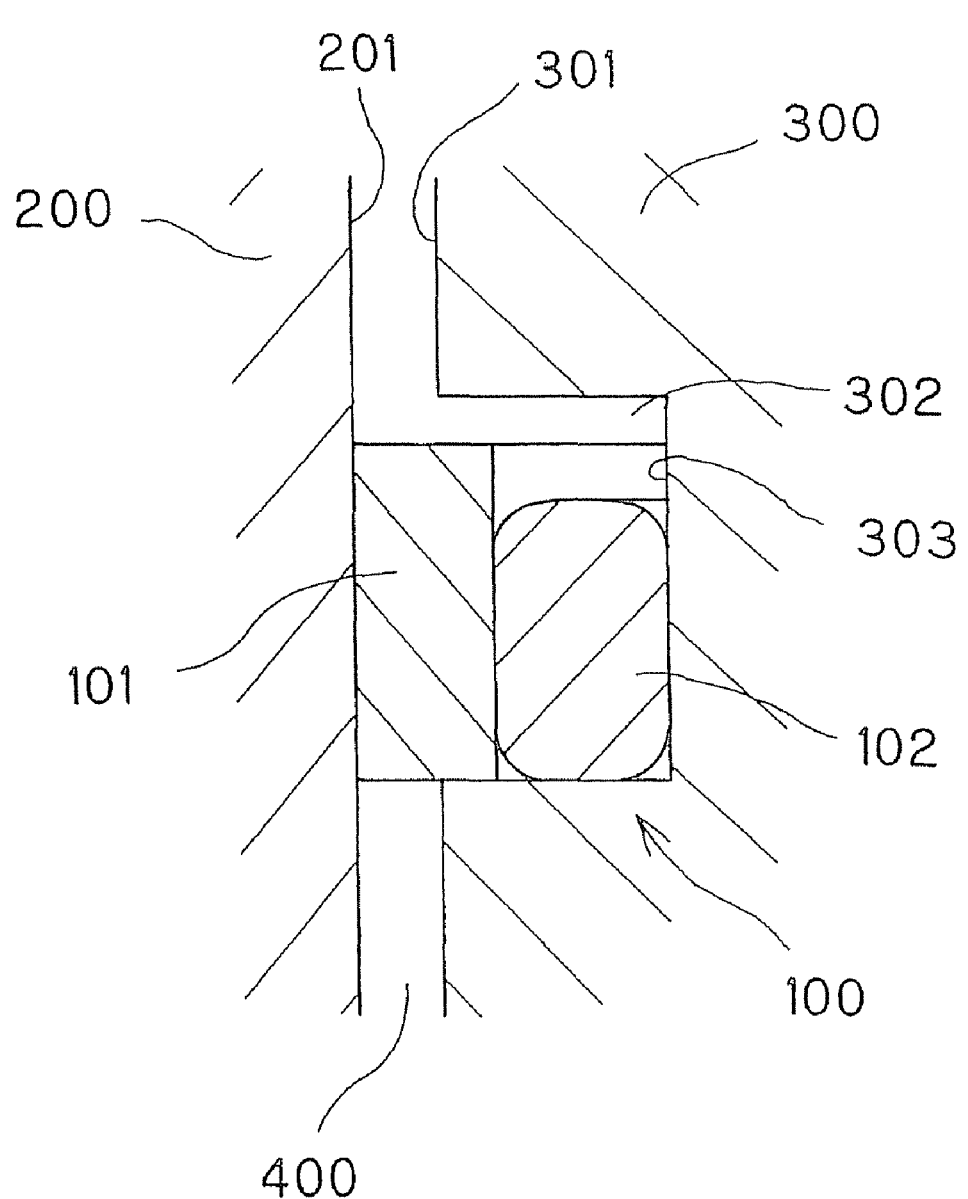
FIG. 15 is a schematic half sectional view of a prior-art sealing device.

Sealing devices according to modifications of the invention will be described with reference to FIGS. 14(*a*) to 14(*c*). FIGS. 14(*a*) to 14(*c*) are schematic half sectional views of structures of the sealing devices according to the various modifications of the invention.

Although each of the above embodiments employs a structure combining the seal ring having the substantially rectangular section and the elastic ring having the circular section as the structure of the sealing device, the invention is not limited to such a structure. Therefore, as the structure of the sealing device, it is also possible to employ a structure in combination with what is called a rectangular ring 3*a* having a rectangular section as shown in FIG. 14(*a*) or what is called a D ring 3*b* having a substantially D-shaped section as shown in FIG. 14(*b*) as a biasing member for the seal ring, for example.

Moreover, as shown in FIG. 14(*c*), it is also possible to employ a structure combining an elastic ring 3*c* having a substantially T-shaped odd-shaped section and backup rings 7 respectively disposed on axial opposite sides of the seal ring 2 and the elastic ring 3*c* to prevent protrusion of the seal ring 2 into the annular gap.

A scope of application of the invention is not limited to use of it as the sealing device for reciprocation as in each of the above embodiments. It is needless to say that similar effects to those in the above embodiments can be obtained if the invention is applied to a resin wear ring, a metal bearing, or the like for reciprocation, for example.

The invention claimed is:

1. A sealing device mounted in an annular groove formed in one of two members that are a housing having a shaft hole and a shaft inserted into the shaft hole to seal an annular gap between the two members, the device comprising a seal ring for sliding against the other member due to relative axial movements of the two members;

wherein the seal ring includes, on each of axial opposite end portions of a sliding surface sliding against the other member, a plurality of grooves extending from an end face of the seal ring toward an axial center of the sliding surface;

a boundary between the grooves and the sliding surface is formed only of lines inclined with respect to a sliding direction of the sliding surface;

the plurality of grooves are arranged to be adjacent to each other in a circumferential direction so that an area in which the boundary is formed of the inclined lines continues along an entire circumference of the sliding surface; and wherein the sliding surface includes a recessed portion between the grooves formed at one end portion and the grooves formed at the other end portion.

2. The sealing device according to claim 1, wherein the grooves are inclined grooves extending to be inclined with respect to the axial direction; and one and the other of the inclined grooves adjacent to each other in the circumferential direction are adjacent to each other in such a manner that an overlap is formed between them when viewed in the axial direction.

3. The sealing device according to claim 1, wherein the grooves are wedge-shaped grooves and provided continuously along the entire circumference of the sliding surface.

4. A sealing device mounted in an annular groove formed in one of two members that are a housing having a shaft hole and a shaft inserted into the shaft hole to seal an annular gap between the two members, the device comprising a seal ring for sliding against the other member due to relative axial movements of the two members;

wherein the seal ring includes, on each of axial opposite end portions of a sliding surface sliding against the other member, a plurality of grooves extending from an end face of the seal ring toward an axial center of the sliding surface;

a boundary between the grooves and the sliding surface is formed only of lines inclined with respect to a sliding direction of the sliding surface;

the plurality of grooves are arranged to be adjacent to each other in a circumferential direction so that an area in which the boundary is formed of the inclined lines continues along an entire circumference of the sliding surface;

wherein the grooves are inclined grooves extending to be inclined with respect to the axial direction; and one and the other of the inclined grooves adjacent to each other in the circumferential direction are adjacent to each other in such a manner that an overlap is formed between them when viewed in the axial direction.

* * * * *